(12) United States Patent
Honermann

(10) Patent No.: US 8,033,482 B2
(45) Date of Patent: Oct. 11, 2011

(54) PIVOTING HANDRAIL FOR AN AGRICULTURAL SPRAYER

(75) Inventor: John Honermann, Benson, MN (US)

(73) Assignee: CNH America LLC, New Holland, PA (US)

( * ) Notice: Subject to any disclaimer, the term of this patent is extended or adjusted under 35 U.S.C. 154(b) by 535 days.

(21) Appl. No.: 12/191,668

(22) Filed: Aug. 14, 2008

(65) Prior Publication Data

US 2010/0038451 A1    Feb. 18, 2010

(51) Int. Cl.
*B05B 15/00* (2006.01)

(52) U.S. Cl. ......... 239/289; 239/159; 239/163; 239/167

(58) Field of Classification Search .................. 239/159, 239/163–167, 289; 111/200; 182/82, 93, 182/97

See application file for complete search history.

(56) References Cited

U.S. PATENT DOCUMENTS

| | | | |
|---|---|---|---|
| 2,583,894 A | 1/1952 | Shuck | |
| 4,416,486 A | 11/1983 | McNaught et al. | |
| 5,046,582 A | 9/1991 | Albrecht | |
| 5,921,531 A | 7/1999 | Early | |
| 6,045,157 A | 4/2000 | Poulin | |
| 6,068,277 A | 5/2000 | Magnussen | |
| 6,152,492 A | 11/2000 | Markham et al. | |
| 6,179,312 B1 | 1/2001 | Paschke et al. | |
| 6,264,227 B1 | 7/2001 | Johnson et al. | |
| 6,581,530 B1 | 6/2003 | Hall et al. | |
| 6,598,704 B2 | 7/2003 | Hansen | |
| 6,986,402 B2 | 1/2006 | Hedley et al. | |
| 7,354,050 B2 | 4/2008 | Brockway | |
| 7,578,247 B2 * | 8/2009 | Horn | 111/200 |
| 7,610,867 B2 * | 11/2009 | Horn | 111/200 |
| 2007/0256894 A1 | 11/2007 | Horn et al. | |

FOREIGN PATENT DOCUMENTS

EP    000210465    2/1987

* cited by examiner

*Primary Examiner* — Steven J Ganey
(74) *Attorney, Agent, or Firm* — Rebecca Henkel

(57) ABSTRACT

An agricultural implement includes a frame and at least one wing boom pivotably coupled to the frame. The wing boom is designed to extend generally perpendicularly from the frame when in a working position and generally adjacent the frame when in a transport or stowed position. The outer end of the wing boom rests in a cradle coupled to the frame. The frame further includes a handrail that may be pivoted toward the frame to provide clearance for the cradle when the wing boom is moved to the stowed position.

16 Claims, 6 Drawing Sheets

PIVOTING HANDRAIL FOR AN AGRICULTURAL SPRAYER

BACKGROUND OF THE INVENTION

The present invention relates generally to agricultural implements and, more particularly, to an agricultural sprayer having a pivoting handrail.

Many types of agricultural implements, such as sprayers and planters, have a frame to which a pair of wing booms is pivotably mounted. Depending on the type of agricultural implement, spraying units, seeding units, etc. are mounted to and carried by the wing booms. Generally, the wing booms are mounted at or near a rear end of the frame and pivot between a folded position and an extended position. When the wing booms are in the extended position, the wing booms are generally perpendicular to the implement's path of travel. When the wing booms are in the folded position, the wing booms are folded forward about the rear pivot and generally adjacent the frame. When in the folded position, the wing booms are generally parallel to the path of travel. The wing booms are typically placed in the folded position when the agricultural implement is being stored or transported to and from a work site.

To increase efficiency, agricultural implements are increasingly being equipped with wing booms having greater length thereby increasing the number of spraying units, seed units, and the like that can be mounted to and carried by the wing booms. To place the wing booms in the stowed or transport position, it is necessary for the wing boom itself to fold. For example, the Patriot Sprayer 4420 commercially available from Case New Holland of Benson, Minn. may be mounted with a tri-folding 120 foot wing boom. To lessen the load placed on the rear pivot when the wing booms are folded, a cradle or similar structure is mounted near the front of the implement frame and the outer end of the folded wing boom rests in the cradle.

Many agricultural implements, such as a sprayer, include a platform mounted to the frame that serves as a walkway between the operator cab and the rear components of the implement. When the wing booms are pivoted or folded forward, the cradle is positioned generally over the platform. As such, when the agricultural implement is equipped with a handrail for the platform, the handrail must be removed before the wing booms are folded forward to the stowed position. As this can be time consuming and difficult when in the field, it is not uncommon for the handrail to be removed and left off entirely.

Thus, there remains a need for an agricultural implement in which its wing booms can be folded to a stowed position while maintaining connection of a walkway handrail.

SUMMARY OF THE INVENTION

The invention provides a pivoting handrail for an agricultural implement and, in one embodiment, is directed to an agricultural sprayer having a tank and pivoting handrail that is brought inwardly toward the tank when the sprayer is placed in a transport or stowed position. In this representative embodiment, the sprayer has a walkway generally adjacent the tank and a wing boom that is folded forward when the sprayer is in the stowed position. The outer end of the wing boom, which may be a folding wing boom, rests in a cradle that is moved over the walkway when the wing boom is stowed for storage and/or transport. To provide clearance for the cradle, the handrail is pivoted toward the tank.

It is therefore one object of the invention to provide an agricultural sprayer having a handrail that can be pivoted to make room for a support cradle when the sprayer is in the transport position.

It is a further object of the invention to provide an agricultural sprayer having a swinging handrail that moves in concert with a support cradle for a folded wing boom.

It is yet another object of the invention to provide an agricultural sprayer equipped with a folding wing boom and having a handrail that is not removed when the wing boom is moved to a stowed position.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
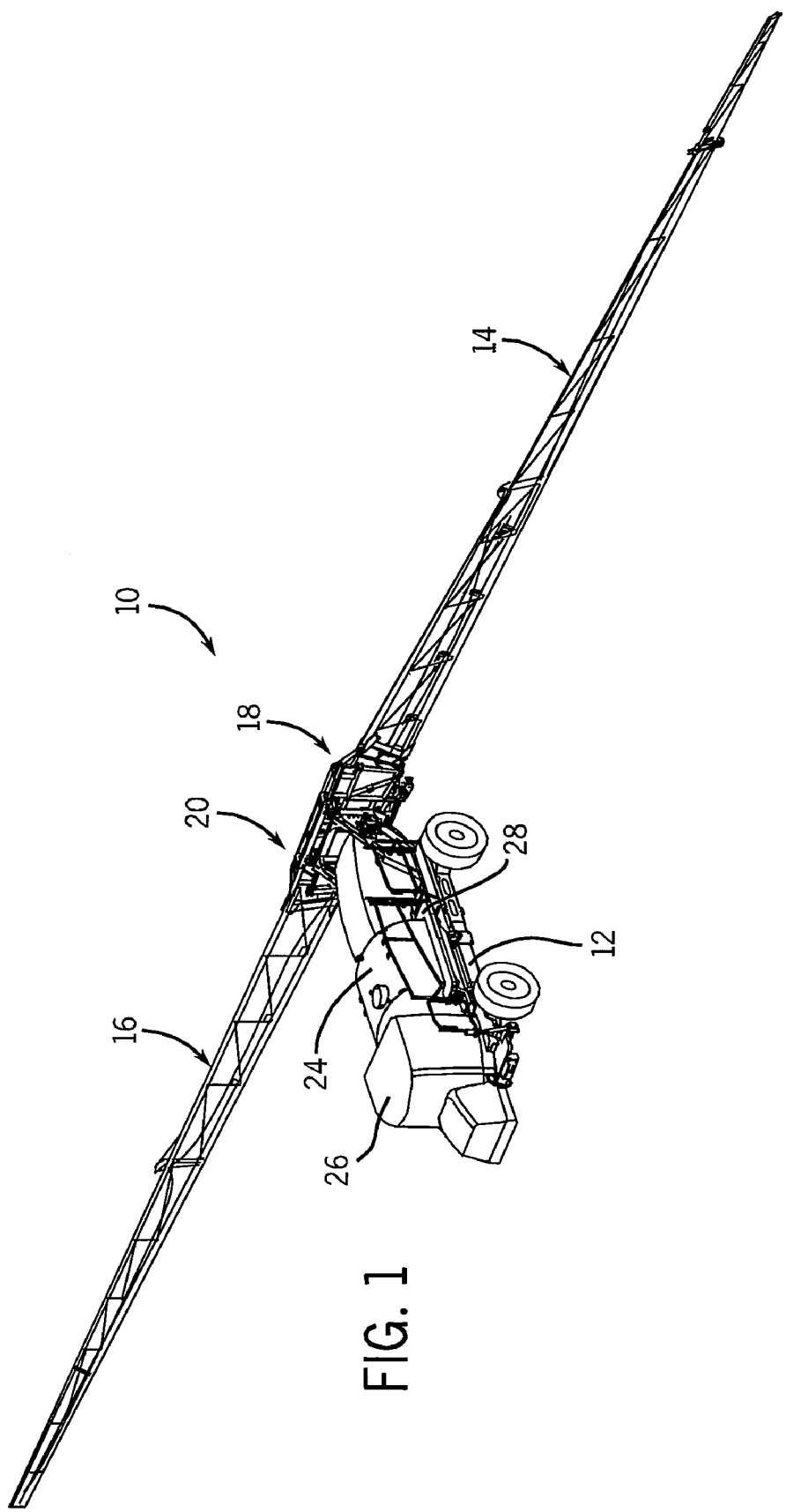
FIG. 1 is an isometric view of an agricultural sprayer.

FIG. 1 shows an agricultural sprayer 10 according to one embodiment of the present invention. While an agricultural sprayer is shown and described, it is understood that the present invention is not limited to an agricultural sprayer and thus may be applicable with other types of machines including, but not limited to agricultural and construction machines.

The agricultural sprayer 10 includes a frame 12 to which a pair of wing booms 14, 16 are connected. For sake of description, wing boom 14 is considered a left wing boom and wing boom 16 is considered a right wing boom. The wing booms 14, 16 are connected at or near the rear of the frame 12 about respective pivot connections 18, 20. The wing booms 14, 16 are designed to fold forward toward the leading end of the frame 12 when the wing booms are moved from an extended position, shown in FIG. 1, to a stowed or transport position, shown in FIG. 2 for the left wing boom 14 only. One skilled in the art will appreciate that the right wing boom 16 is stored in a similar manner on an opposite side of the frame.

Each wing boom 14, 16 supports a series of spraying units (not shown) designed to deliver fluid from tank 24, centrally supported on frame 12, onto a farming or planting surface. As noted above, the tank 24 is positioned generally in the center of the frame 12 between the wing booms 14, 16 and an operator cab 26. The tank 24 is designed to contain fluid, such as herbicide, insecticide, and fertilizer, which is fed to the spraying units through a series of fluid lines (not shown) as known in the art. As also known in the art, the operator cab 26 contains a control panel (not shown) that has various operator controls for controlling operation of the sprayer and its components.

Adjacent the left side of the tank 24 is a platform 28 that provides a walkway from the operator cab 26 to the rear of the frame 12. A staircase 30 leads up to the platform 28 and provides a point of entry/exit for the platform 28. As will explained in greater detail below, the sprayer 10 includes a handrail 32 that is designed to pivot inward to the tank 24 when the wing boom 14 is moved to the stowed position.

Figure 2:
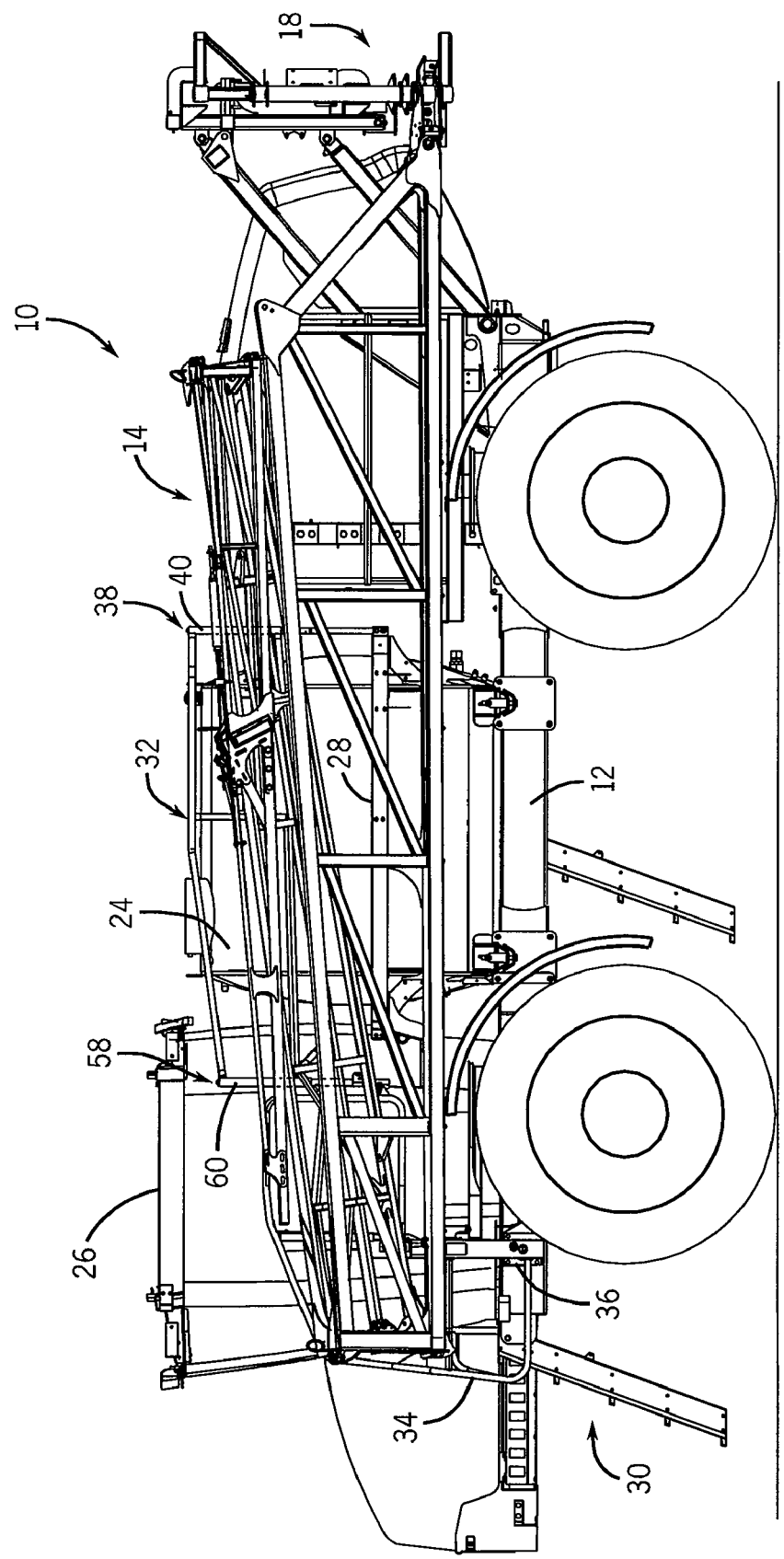
FIG. 2 is a side elevation view of the agricultural sprayer shown in FIG. 1.

In one embodiment, the wing booms 14, 16 are each tri-folding booms that fold upon themselves before or while being moved from the working position to the transport position. As shown in FIG. 2, the folded wing boom 14 is pivoted forward by rear pivot connection 18 and is seated in a cradle 34. The cradle 34 therefore provides support for the wing boom 14 thereby reducing the load placed on the pivot connection 18. Although not shown in the drawings, it is understood that the right side wing boom 16 is similarly folded and seated on a cradle (not shown) when moved to the stowed position.

As known in the art, the cradle 34 is connected to the frame 12 via mechanically actuated slide 36. The slide 36 is designed to push and pull the cradle 34 in response to an operator input. It is contemplated that a separate control may be used to control the slide 36 or the slide may be moved in response to a control input to move the wing boom 14 between the stowed and operating positions.

Figure 3:
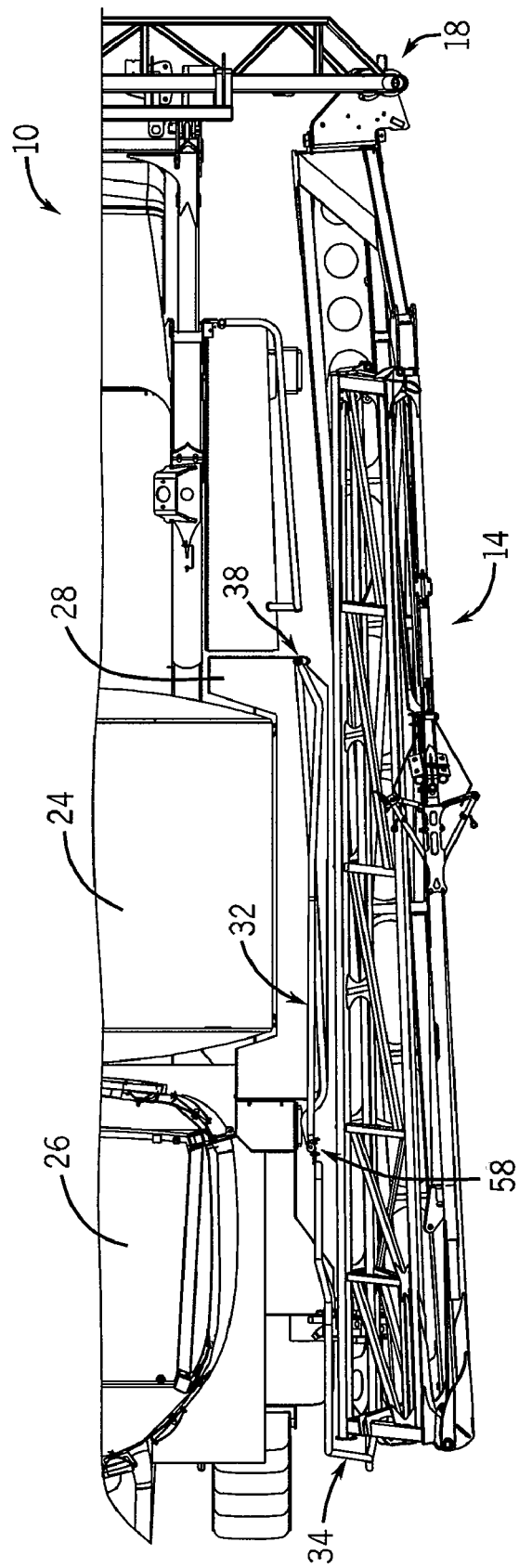
FIG. 3 is a partial top view of the agricultural sprayer of FIG. 1 with a handrail in a field operable position.
Figure 4:
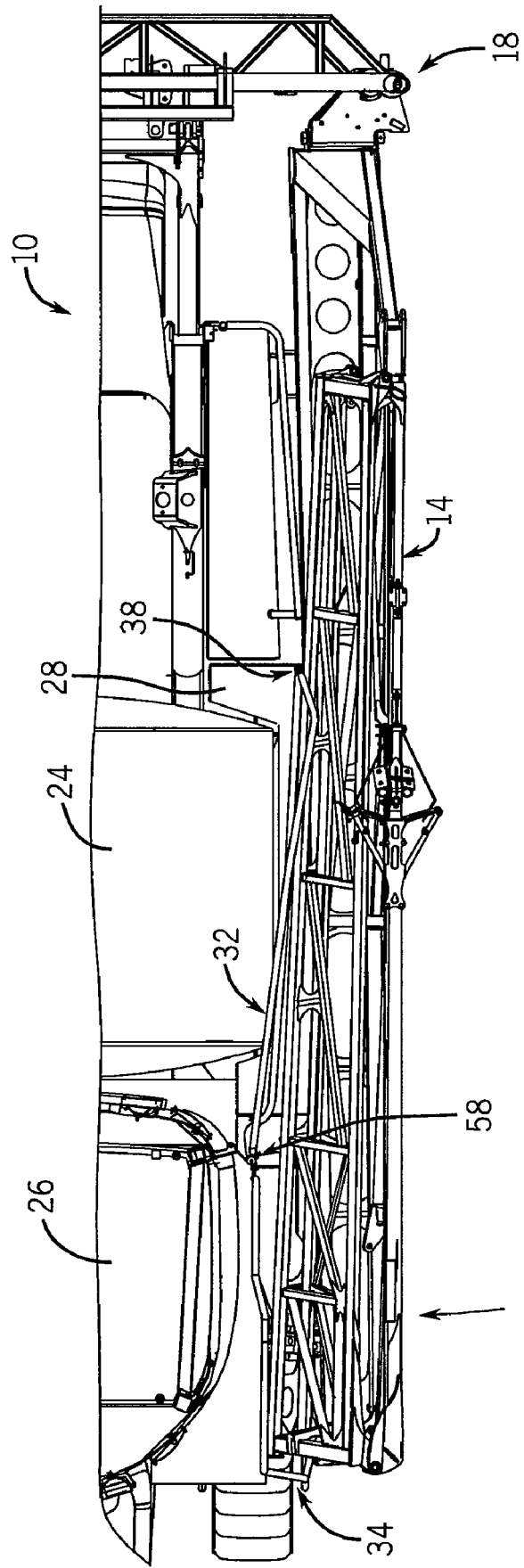
FIG. 4 is a partial top view of the agricultural sprayer of FIG. 2 with the handrail in a transport position.

As referenced above, the handrail 32 is designed to swing or pivot inwardly toward the tank 24 when the wing boom 14 is in the stowed position. More particularly, as illustrated in FIG. 3, the handrail 32 is generally spaced and parallel with the tank 24 thereby allowing operator access to the platform 28 and the components of the sprayer 10 accessible from the platform 28. On the other hand, as shown in FIG. 4, when the cradle 34 is pulled toward the operator cab 26, the handrail 32 pivots generally about a rear pivot connection 38 such that the handrail 32 angles inwardly from a rear end of the platform 28 toward the tank 24. This pivoting of the handrail 32 clears the handrail out of the way for the cradle 34 thereby allowing the wing boom 14 to be brought closer to the tank 24.

Figure 5:
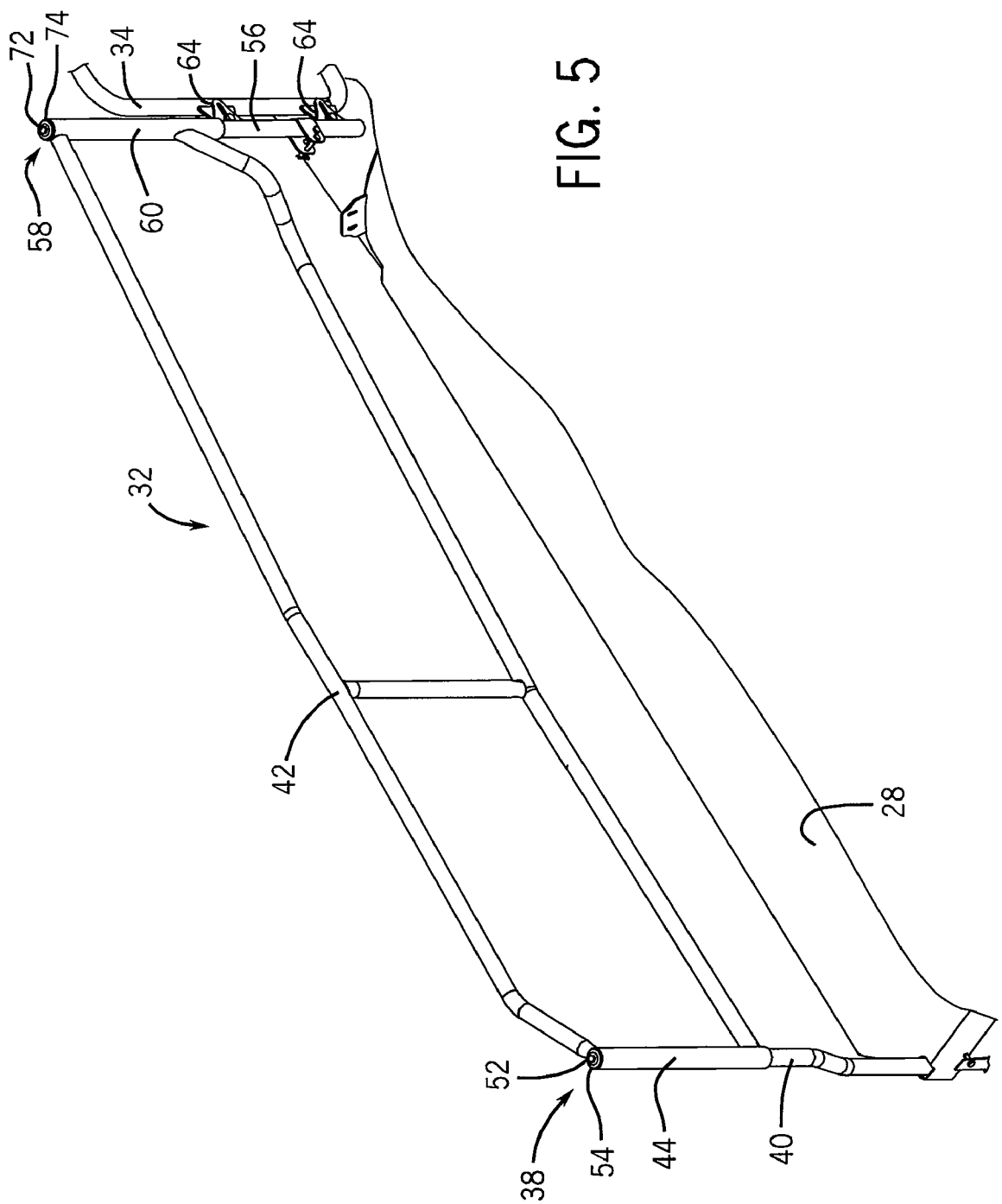
FIG. 5 is an isometric view of the agricultural sprayer illustrating connection of the handrail to a platform generally adjacent a tank of the agricultural sprayer and connection of the handrail to the cradle of the agricultural sprayer of FIG. 1 according to one aspect of the present invention.

Although numerous types of connections are contemplated, in one representative embodiment, a post 40 is mounted to the platform 28 as shown in FIG. 5. The handrail 32 has a frame 42 that includes a rear tubular member 44 that fits over the post 40. The tubular member 44 is connected to the post 40 in a known manner that allows the handrail 32 to rotate or pivot about the rear post 40. In one representative embodiment, and with further reference to FIG. 6, the top end of the rear post 40 includes a weld nut 46 with a centrally positioned threaded bore 48. The bore 48 aligns with a corresponding hole 50 in the tubular frame member 44. When the tubular member 44 is fit over the post, a locking bolt 52 is inserted into the opening 50 and threaded into engagement with post 40 via threaded bore 48. A washer 54 may be used between the tubular member 44 and the bolt 52. In a preferred embodiment, the locking bolt 52 is hand tightened into engagement with the post 40 so that the handrail 32 may pivot about the post 40.

As shown in FIG. 5, the front end of the handrail 32 is connected to a front post 56 via a front pivot connection 58. The front pivot connection 58 is similar to rear pivot connection 38 in that the handrail 32 includes a front tubular member 60 that fits over a front post 62. The front post 62 is connected to the cradle 34 by a pair of brackets 64. With additional reference to FIG. 6, the top end of the front post 56 includes a weld nut 66 with a centrally positioned threaded bore 68. The bore 68 aligns with a corresponding hole 70 in the tubular frame member 60. When the tubular member 60 is fit over the post 62, a locking bolt 72 is inserted into the opening 70 and threaded into engagement with post 62 via threaded bore 68. A washer 74 may be used between the tubular member 60 and the bolt 72. In a preferred embodiment, the locking bolt 72 is hand tightened into engagement with the post 62 so that the handrail 32 may pivot about the post 62.

Figure 6:
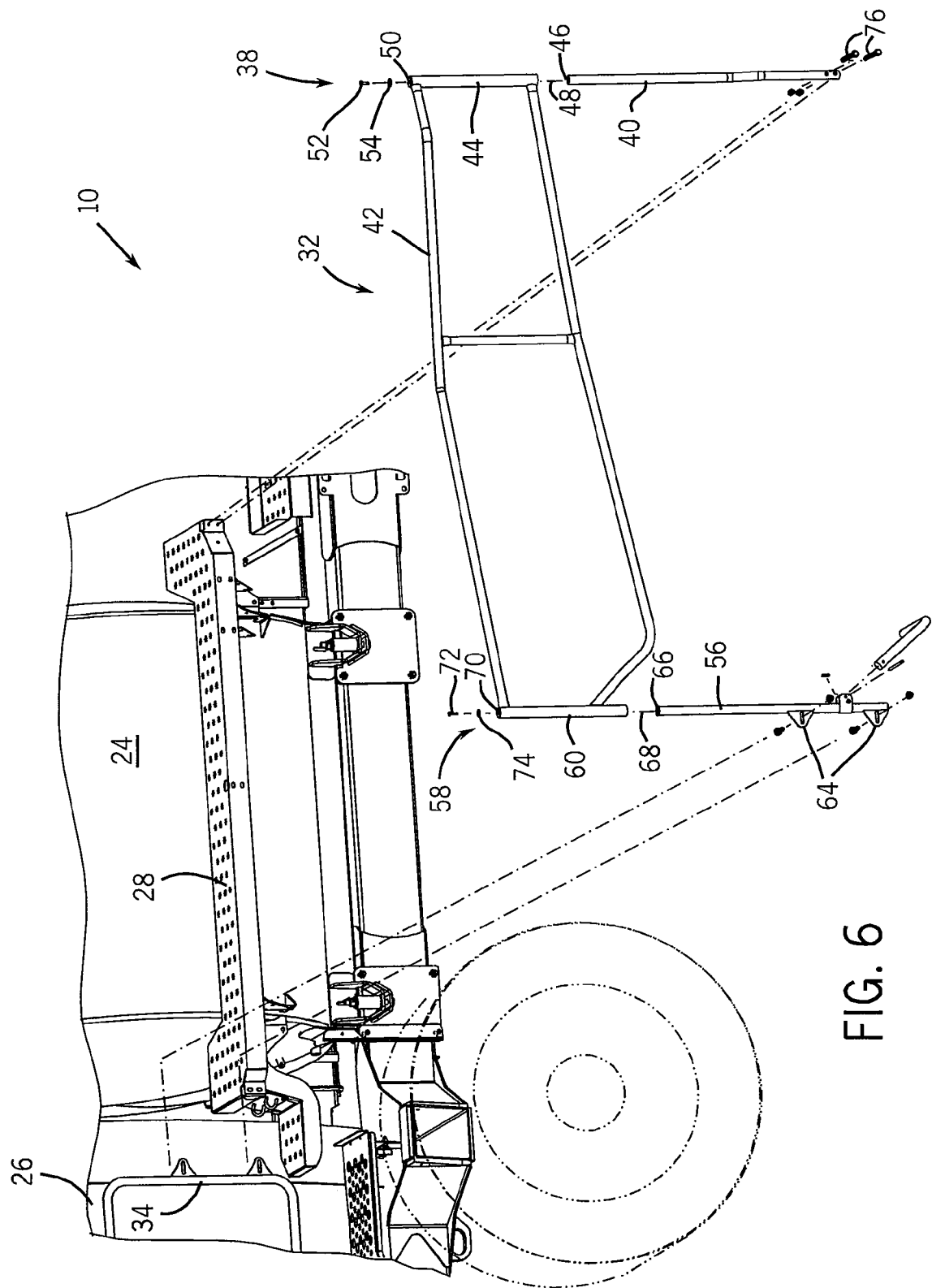
FIG. 6 is an exploded view of the handrail and its connections to a pair of parts according to one aspect of the invention.

As further shown in FIG. 6, a pair of locking bolts 76 connects the rear post 40 to the platform 28. Although, it is contemplated that the rear post 40 could be integrally formed with the platform 28. Similarly, the front post 62 may be integrally formed with the cradle 34.

The handrail 32 is thus connected at one end to the platform 28 and is connected at an opposite end to the cradle 34. As the cradle 34 is moved toward and away from the operator cab 26 or tank 24, the handrail 32 will pivot generally about the rear post 40. As such, the handrail 32 can be drawn inwardly toward the tank 24 to allow the cradle 34 to be drawn over the platform 28 when the wing boom 14 is placed in the stowed position. As apparent from a comparison of FIGS. 3 and 4, drawing the cradle to be a position generally adjacent the tank 24 narrows the width of the sprayer 10 when the wing boom 14 is in the stowed position. This is particularly advantageous when transporting the sprayer 10 along width-restricted roadways.

It is contemplated that the present invention may be embodied in a kit for retrofitting an existing machine to have a pivoting handrail. Such a kit may include a pair of posts that may be suitably connected to the platform and cradle as described herein and further include a replacement handrail designed to interface with the posts as similarly described herein. Preferably, the kit would also include any bolts, washers, brackets, and the like to make the necessary connections of the posts and the handrail.

Various alternatives and embodiments are contemplated as being within the scope of the following claims particularly pointing out and distinctly claiming the subject matter regarded as the invention.

I claim:

1. An agricultural sprayer comprising:
a tank configured to hold a fluid;
a frame supporting the tank and including a platform generally adjacent the tank;
a wing boom connected to the frame and supporting a plurality of spray units, and movable between a working position and a stowed position; and
a handrail associated with the platform and configured to move inwardly toward the tank when the wing boom is moved to the stowed position.

2. The sprayer of claim 1 further comprising a cradle connected to the frame and configured to support the wing boom when the wing boom is in the stowed position.

3. The sprayer of claim 2 wherein the handrail has a first end pivotably connected to the platform and a second end pivotably connected to the cradle.

4. The sprayer of claim 3 further comprising a first post mounted to the platform and a second post mounted to the cradle, and wherein the first end is pivotably connected to the first post and the second end is pivotably connected to the second post.

5. The sprayer of claim 4 wherein the first end includes a tubular member fitted over the first post and the second end includes a tubular member fitted over the second post.

6. The sprayer of claim 5 wherein the first end is configured to rotate about the first post and the second end is configured to rotate about the second post.

7. The sprayer of claim 2 wherein the handrail is connected to the platform and the cradle such that the handrail moves automatically with movement of the cradle as the wing boom is moved to the stowed position.

8. An agricultural implement having a tank configured to hold a fluid and a frame supporting the tank and to which a set of sprayers fluidly connected to the tank and configured to spray fluid fed thereto from the tank onto a surface, comprising:
- a walkway generally adjacent the tank;
- a wing boom pivotably connected to the frame, the set of sprayers mounted to the wing boom and wherein the wing boom is movable from an extended, working position to a folded, stowed position;
- a boom support connected to the frame and configured to support an outer end of the wing boom when the wing boom in the stowed position;
- a handrail having a first end connected to the walkway and a second end connected to the boom support; and
- wherein the wing boom may be moved to the stowed position without disconnection of the hand rail.

9. The implement of claim 8 wherein the boom support includes a cradle, and further comprising a first post mounted to the cradle and a second post mounted to the walkway, and wherein the first end of the handrail is mounted to the first post and the second end of the handrail is mounted to the second post.

10. The implement of claim 9 wherein the first end of the handrail includes a first tubular member that fits over the first post and the second end of the handrail includes a second tubular member that fits over the second post, and wherein the tubular members are free to pivot about the posts.

11. The implement of claim 10 wherein the handrail is configured to move inwardly toward the tank when the wing boom is moved to the stowed position.

12. The implement of claim 8 further comprising an operator cab forward of the tank.

13. An agricultural sprayer comprising:
- a tank;
- a wing boom;
- a set of spraying units mounted to the wing boom and fluidly connected to the tank;
- a cradle configured to support the wing boom when the wing boom is in a transport position; and
- a walkway generally adjacent the tank; and
- a handrail having a first end connected to the walkway and a second end connected to the cradle, and wherein the handrail is configured to pivot relative to the walkway toward the tank when the wing boom is moved from a working position to the transport position.

14. The sprayer of claim 13 further comprising a first post mounted to the walkway and a second post mounted to the cradle, and wherein the handrail is connected to the first and the second posts.

15. The sprayer of claim 14 wherein the handrail has a first tubular end fitted over the first post and a second tubular end fitted over the second post, and wherein the tubular ends are free to rotate about their respective posts.

16. The sprayer of claim 15 wherein the handrail is angled from the first post to the second post when the wing boom is in the transport position.

* * * * *